(12) United States Patent
Tachibana et al.

(10) Patent No.: US 6,336,432 B2
(45) Date of Patent: Jan. 8, 2002

(54) VALVE TIMING CONTROL SYSTEM FOR INTERNAL COMBUSTION ENGINE

(75) Inventors: Yosuke Tachibana; Junichi Suzuki; Tomoya Furukawa; Shun Masuda, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/733,909

(22) Filed: Dec. 12, 2000

(30) Foreign Application Priority Data

Dec. 24, 1999 (JP) .......................................... 11-368024

(51) Int. Cl.[7] ................................................. F01L 1/34
(52) U.S. Cl. .................................. 123/90.15; 123/90.17
(58) Field of Search ......................... 123/90.15, 90.16, 123/90.17, 90.18, 90.31

(56) References Cited

U.S. PATENT DOCUMENTS

| | | | | |
|---|---|---|---|---|
| 5,562,071 A | * | 10/1996 | Urushihata et al. | ...... 123/90.15 |
| 5,623,896 A | * | 4/1997 | Kato et al. | ................ 123/90.15 |
| 5,626,108 A | * | 5/1997 | Kato et al. | ................ 123/90.15 |
| 5,937,808 A | * | 8/1999 | Kako et al. | ............... 123/90.15 |
| 6,161,511 A | * | 12/2000 | Hashimoto | ................ 123/90.15 |
| 6,170,446 B1 | * | 1/2001 | Hashimoto | ................ 123/90.15 |
| 6,196,173 B1 | * | 3/2001 | Takahashi et al. | ....... 123/90.15 |
| 6,240,359 B1 | * | 5/2001 | Fujiwara et al. | ............ 701/114 |

* cited by examiner

Primary Examiner—Weilun Lo
(74) Attorney, Agent, or Firm—Arent Fox Kintner Plotkin & Kahn, PLLC

(57) ABSTRACT

There is provided a valve timing control system for an internal combustion engine, which is capable of properly setting the reference position of the cam phase by learning, and at the same time promptly establishing a learned value of the reference position when the learned value is lost, thereby accurately changing the cam phase for proper control of the valve timing of the engine. A cam phase change mechanism changes the cam phase. A reference value indicative of a reference position of the cam phase is learned at a predetermined learning speed based on the cam phase detected when the cam phase change mechanism is in a predetermined operative state, and the learned reference value (learned value) is stored in a RAM. When the loss of the learned value from the RAM is detected, a learning speed at the reference value is learned is corrected such that the learning speed is increased from the predetermined learning speed for a predetermined time period.

6 Claims, 4 Drawing Sheets

VALVE TIMING CONTROL SYSTEM FOR INTERNAL COMBUSTION ENGINE

BACKGROUND OF THE INVENTION

1. Field of the Invention

This invention relates to a valve timing control system for an internal combustion engine, and more particularly to a valve timing control system for an internal combustion engine which controls valve timing of the engine by changing a cam phase while learning a reference value indicative of a reference position of the cam phase.

2. Description of the Prior Art

Conventionally, a valve timing control system of this kind for an internal combustion engine (hereinafter simply referred to as "the engine") was proposed e.g. in Japanese Laid-Open Patent Publication (Kokai) No. 6-299876. This valve timing control system includes a cam phase change mechanism that is capable of changing the valve timing by advancing or retarding the angle of a phase of a cam shaft relative to a crankshaft (cam phase), a crank angle sensor for detecting a crank angle, a cam sensor for detecting a cam angle, and an ECU for controlling the cam phase change mechanism based on outputs from these sensors. This valve timing control system calculates a cam phase from values of the crank angle and the cam angle detected during idling when the cam phase change mechanism is not in operation, and the cam phase is most retarded, calculates a cam phase from values of the crank angle and the cam angle detected when the cam phase change mechanism is in operation, and calculates an actual cam phase as a difference between these cam phases. Then, from a difference between a desired cam phase determined based on engine operation conditions with reference to a predetermined table, and the actual cam phase, a feedback control value for controlling the cam phase change mechanism is determined, and a drive signal based on the feedback control value is supplied to the cam phase change mechanism to control the same.

As described above, according to the conventional valve timing control system, the actual cam phase is determined from a difference between a cam phase detected when the cam phase change mechanism is in a non-operating condition in which the cam phase is most retarded and a cam phase detected when the same is in operation. More specifically, the cam angle detected when the cam phase is most retarded is only defined as a reference position (zero point) of the cam phase. Therefore, when values of the crank angle and the cam angle detected by the crank angle sensor and cam angle sensor contain errors, or when rotation of the engine is unstable, the zero point is varied and hence a correct zero point cannot be obtained. This prevents proper control of the cam phase change mechanism. Of course, it is possible to obtain a correct zero point by learning the zero point while taking into errors in detection by the sensors and changes in operating condition of the engine. However, if the learned value of the zero point stored in the RAM is lost e.g. due to replacement of a battery and instantaneous shut-down of the power supply to the ECU, it takes time to learn the zero point again. This makes it impossible to control the cam phase change mechanism by using a correct learned value of the zero point, resulting in degraded fuel economy and emission characteristics.

SUMMARY OF THE INVENTION

It is an object of the invention to provide a valve timing control system for an internal combustion engine, which is capable of properly setting the reference position of the cam phase by learning, and at the same time promptly establishing a learned value of the reference position when the learned value is lost, thereby accurately changing the cam phase for proper control of the valve timing of the engine.

To attain the above object, the invention provides a valve timing control system for an internal combustion engine having a crankshaft, an intake cam, and an exhaust cam, the valve timing control system controlling valve timing of the engine by changing a cam phase of at least one of the intake cam and the exhaust cam relative to the crankshaft.

The valve timing control system according to the invention is characterized by comprising:

a cam phase change mechanism for changing the cam phase;

cam phase detection means for detecting the cam phase;

reference position-learning means for learning a reference value indicative of a reference position of the cam phase at a predetermined learning speed based on the cam phase detected by the cam phase detection means when the cam phase change mechanism is in a predetermined operative state;

storage means for storing therein the reference value learned by the reference position learning means;

reference value loss detection means for detecting whether or not the reference value is lost from the storage means; and learning speed-correcting means for correcting a learning speed at which the reference position-learning means learns the reference value such that the learning speed is increased from the predetermined learning speed for a predetermined time period, when the reference value loss detection means detects loss of the reference value from the storage means.

According to this valve timing control system, normally, based on the cam phase detected by the cam phase detection means when the cam phase change mechanism is in a predetermined operative state, the reference position-learning means learns the reference value indicative of the reference position of the cam phase at the predetermined learning speed. This learning makes it possible to properly set the reference value indicative of the reference position of the cam phase. Further, when the reference value loss detection means detects the loss of the reference value from the storage means, the learning speed correction means corrects the learning speed at which the reference value is learned such that the learning speed is increased from the predetermined learning speed, for the predetermined time period. This makes it possible to establish the reference value (learned value) promptly when the learned reference value is lost from the storage means. As a result, it is possible to properly change the cam phase, to thereby properly control the valve timing of the internal combustion engine.

Preferably, the storage means comprises a first RAM, and the reference value loss detection means is a counter implemented by a second RAM that is provided separately from the first RAM and is battery-backed-up, the counter detecting the loss of the reference value from the first RAM due to interruption of supply of electric current to the first RAM by being reset to a predetermined value when the interruption of the supply of electric current to the first RAM occurs.

Preferably, the predetermined operative state of the cam phase change mechanism is a state in which the cam phase change mechanism is not in operation and the cam-phase is most retarded.

Preferably, the valve timing control system includes operating condition determination means for determining whether or not the engine is in a predetermined operating condition suitable for learning of the reference value, and reference value learning-permitting means for permitting the learning of the reference value when the operating condition determination means determines that the engine is in the predetermined operating condition.

More preferably, the predetermined operating condition of the engine is a condition in which a predetermined time period has elapsed after a start of the engine, the intake cam is in a most retarded state, and a rotational speed of the engine is equal to or larger than a predetermined value, and a variation in the rotational speed of the engine is lower than a predetermined level.

Preferably, the learning speed correction means comprises a downcount timer which is set to a predetermined time period when the reference value loss detection means detects the loss of the reference value from the storage means, and coefficient-setting means for setting an averaging coefficient applied to an average value-calculating equation used for the learning of the reference value to a value corresponding to a larger leaning speed than the predetermined learning speed, before the downcount timer counts down to zero.

The above and other objects, features, and advantages of the invention will become more apparent from the following detailed description taken in conjunction with the accompanying drawings.

DETAILED DESCRIPTION

Figure 1:
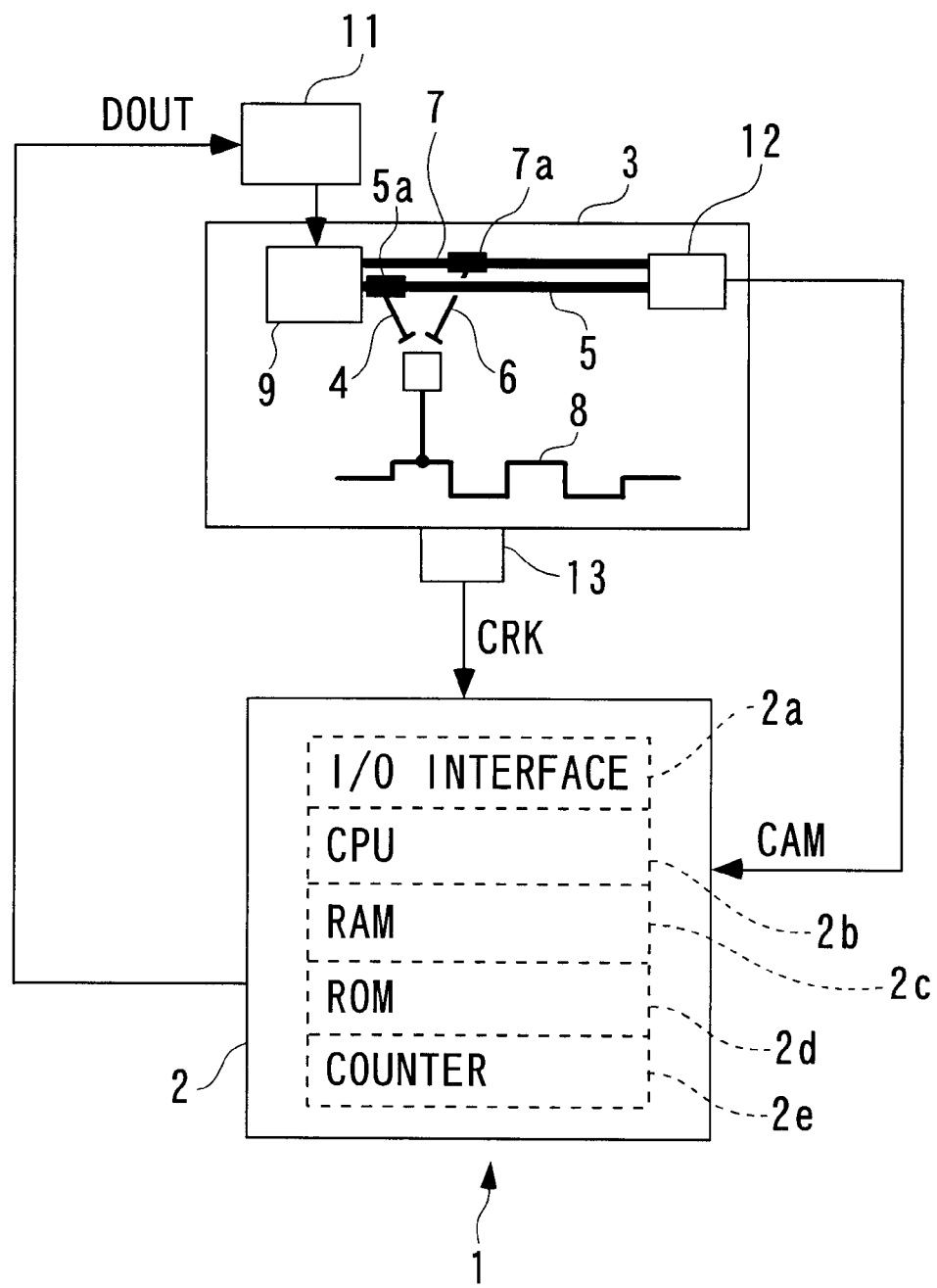
FIG. 1 is a block diagram schematically showing the arrangement of an internal combustion engine incorporating a valve timing control system according to an embodiment of the invention.

The invention will now be described in detail with reference to the drawings showing an embodiment thereof. Referring first to FIG. 1, there is schematically shown the arrangement of an internal combustion engine incorporating a valve timing control system according to an embodiment of the invention. As shown in the figure, the valve timing control system 1 includes an ECU 2 (reference position-learning means, storage means, reference value loss detection means, and learning speed-correcting means) that carries out zero point learning of a cam phase CAIN in dependence on operating conditions of an internal combustion engine (hereinafter simply referred to as "the engine") 3.

The engine 3 is a four-stroke cycle DOHC (double overhead camshaft) gasoline engine, which includes an intake camshaft 5 for driving intake valves 4 (only one of them is shown) and an exhaust camshaft 7 for driving exhaust valves 6 (only one of them is shown). The intake camshaft 5 has intake cams 5a (only one of them is shown) provided thereon which are rotated by rotation of the intake camshaft 5 during operation of the engine 3, for opening and closing the respective intake valves 4. The exhaust camshaft 7 has exhaust cams 7a (only one of them is shown) provided thereon which are rotated by rotation of the exhaust camshaft 7 during operation of the engine 3, for opening and closing the respective exhaust valves 5. The intake and exhaust camshafts 5, 7 are connected to a crankshaft 8 by a timing belt, not shown, and rotated as the crankshaft 8 rotates. Cam phase change mechanisms (hereinafter referred to as "the VTCs") 9 are arranged at respective one ends of the intake camshaft 5 and the exhaust camshaft 7, for changing the cam phase of each intake cam 5a and the cam phase of each exhaust cam 7a relative to the crankshaft 8 in dependence on operating conditions of the engine. It should be noted that the VTCs 9 arranged for the intake camshaft 5 and the exhaust camshaft 7 have the same construction, and therefore, the following description will be made mainly on the intake camshaft 5 and elements and devices associated therewith.

The VTC 9 is driven by oil pressure, for continuously advancing or retarding the phase angle (hereinafter referred to as "the cam phase CAIN") of the intake camshaft 5, i.e. the intake cam 5a, relative to the crankshaft 8, whereby the opening/closing timing of the intake valves 4 is advanced or retarded. The VTC 9 has a solenoid control valve 11 connected thereto which is responsive to a drive signal DOUT formed by a duty signal from the ECU 2 for being driven thereby to supply the oil pressure from an hydraulic pump, not shown, of a lubricating system of the engine 3 to the VTC 9, according to the duty ratio DOUT of the drive signal. Thus, the VTC 9 is controlled by the ECU 2 via the solenoid control valve 11, for advancing or retarding the cam phase CAIN.

Cam angle sensors 12 are arranged at the other ends of the intake camshaft 5 and the exhaust camshaft 7, opposite to the one ends at which the VTC 9 is arranged. Each cam angle sensor 12 is comprised e.g. of a magnet rotor and an MRE (magnetic resistance element) pickup, and delivers a cam signal, which is a pulse signal, to the ECU 2. The cam signal indicates a rotational angle of the intake cam 5a and each pulse thereof is delivered whenever the intake camshaft 5 rotates through a predetermined angle (e.g. two degrees).

The engine 3 includes a crank angle position sensor 13 for detecting the rotational angle, i.e. crank angle, of the crankshaft 8. The crank angle position sensor 13 is constructed e.g. similarly to the above cam angle sensor 12, and delivers the CRK signal, which is a pulse signal, to the ECU 2 whenever the crankshaft 8 rotates through a predetermined angle (e.g. one degree). The ECU 2 determines an engine rotational speed NE of the engine 3, based on the CRK signal. Further, the ECU 2 determines the cam phase CAIN of the intake cam 5a relative to the crankshaft 8 based on the CRK signal and the cam signal.

The ECU 2 is formed by a microcomputer including an I/O interface 2a, a CPU 2b, a RAM 2c (storage means), a ROM 2d, and a counter 2e (reference value loss detection means). The signals from the cam angle sensor 12 and the crank angle sensor 13 are each input to the CPU 2b after A/D conversion and waveform shaping by the I/O interface 2a.

The CPU 2b determines an operating condition of the engine 3 based on the signals from the sensors 12, 13, etc. and carries out a zero point-learning process, described hereinafter, for learning a zero point of the cam phase CAIN based on data stored in the RAM 2c and a control program and data stored beforehand in the ROM 2d. The zero point-learning process calculates a value (hereinafter referred to as "the zero point value CAINZP") indicative of a reference position (hereinafter referred to as "the zero point") of the cam phase CAIN with reference to which the VTC 9 drives the intake cam 5a. Then, the thus calculated zero point value CAINZP is updated and stored in the RAM 2c.

Further, the counter 2e detects whether or not a battery cancellation has occurred, i.e. whether or not the zero point value CAINZP stored in the RAM 2c is lost e.g. due to replacement of a battery, or instantaneous interruption of power supply to the ECU 2. The counter 2e is formed by another RAM or the like provided separately from the RAM 2c, and preserves the count thereof by its backup battery, not only when the engine 3 is stopped but also after the battery cancellation has occurred. More specifically, whenever data stored in the RAM 2c is referred to by various processes executed by the ECU 2, the count of the counter 2e is incremented by one, and when the replacement of a battery is carried out, or when the supply of the power to the ECU 2 is interrupted, the counter 2e is reset to 0. Further, when the engine 3 is started, i.e. when an ignition switch is turned on, if it is found that the count of the counter 2e is not equal to 0, i.e. there has occurred no battery cancellation, the counter 2e is also reset to 0. Therefore, when the ignition switch is turned on or when the engine 3 is in operation, if it is determined that the count of the counter 2e is equal to 0, it is determined that there has occurred a battery cancellation, i.e. the zero point value CAINZP stored in the RAM 2c is lost.

Figure 2:
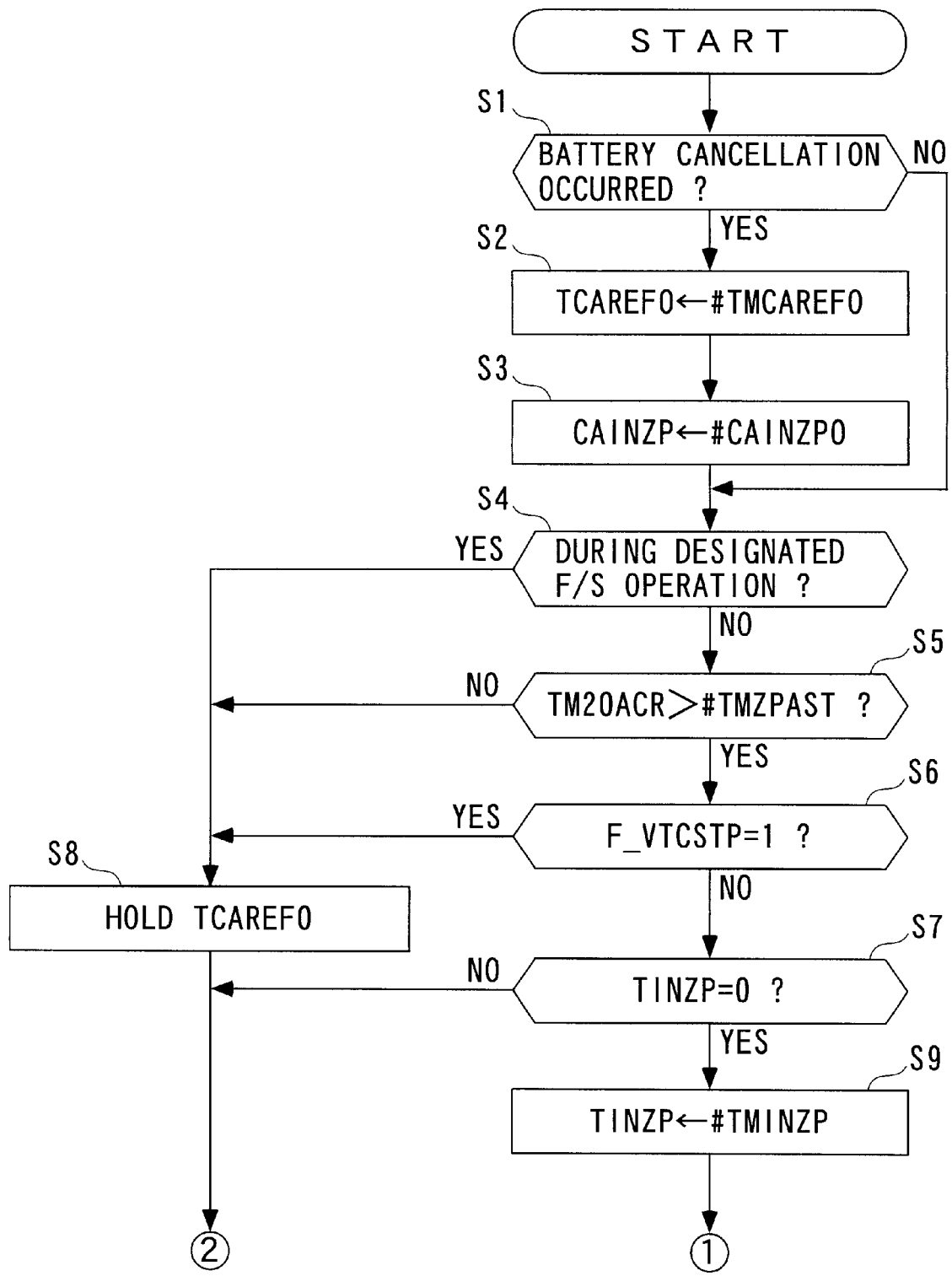
FIG. 2 is a flowchart showing a zero point-learning process carried out by the valve timing control system for learning a zero point of a cam phase.

Now, the zero point-learning process for learning the zero point of the cam phase CAIN will be described with reference to a flowchart shown in FIGS. 2 to 4. In the following description, variables whose values stored beforehand in the ROM 2d are fixed are indicated by respective symbols each having a character # at the head thereof for discrimination from values which are updated.

This zero point-learning process is executed whenever a predetermined time period (e.g. 10 msec.) set by a timer elapses. First, at a step S1, it is determined whether or not a battery cancellation has occurred. If it is determined that the battery cancellation has occurred, i.e. if the zero point value CAINZP is lost from the RAM 2c (YES to step 1), a zero point calculation execution timer TCAREF0 as a downcount timer is set to a predetermined zero point calculation execution time #TMCAREF0 (e.g. four seconds) stored beforehand as a setting in the ROM 2d, at a step S2, and the zero point value CAINZP is set to a predetermined initial zero point value #CAINZP0 (e.g. 0 or a value close to 0) at a step S3. On the other hand, if it is determined that no battery cancellation has occurred (NO to step S1), the zero point calculation execution timer TCAREF0 and the zero point value CAINZP are held at respective values already set on the preceding occasions.

Next, it is determined at a step S4 whether or not a failure signal for a predetermined designated failsafe operation has been generated, and at a step S5 whether or not the count of an after-start measurement timer TM20ACR for counting time elapsed after the engine 3 is started is larger than a predetermined stability-ensuring time period #TMZPAST which is set e.g. to 20 seconds for determining whether the engine 3 is in a stable operating condition after it is started. Further, a learning inhibition flag F_VTCSTP indicative of the most retarded state of the intake cam 5 is checked at a step S6. The learning inhibition flag F_VTCSTP is provided for determining whether or not the zero point learning process should be executed, and set to "1" when the intake cam 5a is not in the most retarded state, i.e. when the zero point learning process should not be executed. If the failure signal for the predetermined failsafe operation is not generated (NO to step S4), the count of the after-start measurement timer TM20ACR exceeds the stability-ensuring time period #TMZPAST (YES to step S5), and at the same time, the learning inhibition flag F_VTCSTP does not assume "1" (NO to step S6), it is determined that basic conditions for learning the zero point are satisfied, and the program proceeds to a step S7, whereas if not, i.e. if the result of the determination at the step S4 is affirmative (YES), if the result of the determination at the step S5 is negative (NO), or the result of the determination at the step S6 is affirmative (YES), it is determined that the basic conditions for the zero point learning are not satisfied, and the count of the zero point calculation execution timer TCAREF0 is held at the step S8, followed by terminating the program.

At the step S7, it is determined whether or not the count (initially set to "0") of a zero point calculation period timer TINZP as a downcount timer is equal to 0, and if the result of this determination is affirmative (YES), the zero point calculation period timer TINZP is set to a predetermined zero point calculation period #TMINZP (e.g. 100 msec.) and started at a step S9, whereas if the result of the determination at the step S7 is negative (NO), i.e. if the zero point calculation repetition period #TMINZP has not elapsed after the basic conditions for learning the zero point are satisfied, the program is immediately terminated.

After the zero point calculation period timer TINZP is set to the predetermined zero point calculation period #TMINZP at the step S9, a VTC operation determination flag F_VTC indicative of whether or not the VTC 9 is in operation is checked at a step S10. The VTC operation determination flag F_VTC is used for determining whether or not the VTC 9 is in operation, and set to "1" when the VTC 9 is in operation. Next, it is determined whether or not the engine rotational speed NE is equal to or higher than a predetermined lower limit rotational speed #NECAINZPL (e.g. 200 rpm) for execution of the zero point learning at a step S11, and further, an engine rotation variation-indicative value DNE is smaller than a predetermined upper limit value #DNEINZP (e.g. ±50 rpm) thereof for execution of the zero point learning. If the VTC operation determination flag F_VTC does not assume "1", i.e. if the VTC 9 is not in operation (NO to step S10), at the same time if the engine rotational speed NE is equal to or larger than the predetermined lower limit value #NECAINZPL, i.e. if the rotation of the engine 3 in operation is stable (YES to step S11), and at the same time if the engine rotation variation-indicative value DNE is smaller than the predetermined upper limit value #DNEINZP, i.e. if the variation in the engine rotational speed is small (YES to step S12), the program proceeds to a step S13. Otherwise, i.e. if the result of the determination at the step S10 is affirmative (YES), or if the result of the determination at the step S11 is negative (NO), or if the result of the determination at the step S12 is negative (NO), it is determined that the conditions for learning the zero point are not satisfied, so that the zero point calculation execution timer TCAREF0 continues to be held at a step S17, and limit checking (steps S18 to S21), described hereinafter, is executed, followed by terminating the program.

At the step S13, it is determined whether or not the zero point calculation execution timer TCAREF0 assumes "0". The zero point calculation execution time TCAREF0 is set at the step S2 when the battery cancellation has occurred, as described above, and held at the step S8 or S17 when the conditions for learning the zero point are not satisfied. Therefore, it measures a time period elapsed after the conditions for learning the zero point are satisfied after battery cancellation has occurred. If the result of the determination at the step S13 is negative (NO), i.e. if the predetermined zero point calculation execution time #TMCAREF0 has not elapsed after the conditions for learning the zero point are satisfied, a zero point calculation coefficient CAINREF is set to an after-battery-cancellation value #CARINREF0 at a step S14, whereas if the result of the determination at the step S13 is affirmative (YES), i.e. if the predetermined zero point calculation execution time #TMCAREF0 has elapsed, the zero point calculation coefficient CAINREF is set to a normal use value #CAINREF at a step S15. The after-battery-cancellation value #CARINREF0 is much larger than the normal use value #CAINREF, and for instance, the former is et to 0.04 while the latter to 0.004.

Next, at a step S16, the zero point value CAINZP is calculated by using the zero point calculation coefficient CAINREF set at the step S14 or S15, the cam angle CASVIN detected by the cam angle sensor 12, and the zero point value CAINZP calculated last time. More specifically, the zero point value CAINZP is calculated by using the following equation:

$$CAINZP = [CAINREF/(256)^2] \times CASVIN + [\{(256)^2 - CAINREF\}/(256)^2] \times CAINZP$$

In the above equation, the term $[CAINREF/(256)^2]$ multiplied by the cam angle CASVIN, and the term $[\{(256)^2 - CAINREF\}/(256)^2]$ multiplied by the immediately preceding zero point value CAINZP calculated last time are averaging coefficients for calculating the zero point value CAINZP. More specifically, since the zero point calculation coefficient CAINREF is multiplied by the cam angle CASVIN, as the zero point calculation coefficient CAINREF is larger, the weight of the cam angle CASVIN relative to the immediately preceding zero point value CAINZP becomes larger when the zero point is calculated, whereby the cam angle CASVIN is largely reflected in the zero point calculated, which means that the learning speed of the zero point value CAINZP is increased. As described hereinbefore, after the battery cancellation, before the zero point calculation execution time #TMCAREF0 has elapsed, the zero point calculation coefficient CAINREF is set to the larger value, i.e. the after-battery-cancellation value #CAINREF0, whereby the learning speed at which the zero point value CAINZP is learned can be increased after occurrence of the battery cancellation. On the other hand, after the zero point calculation execution time #TMCAREF0 has elapsed, the zero point calculation coefficient CAINRE is set to the smaller value, i.e. the normal use value #CAINREF, whereby the zero point value CAINZP can be properly learned at a slower speed in a stable manner.

Figure 4:
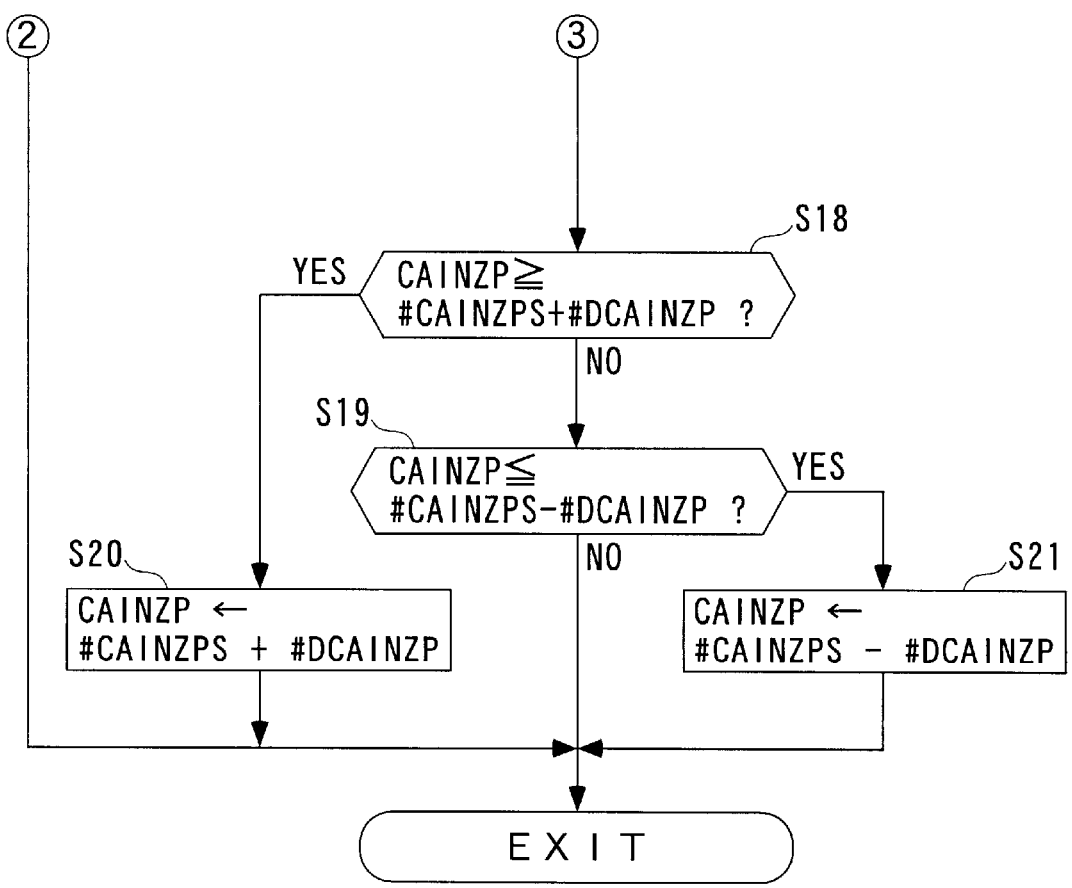
FIG. 4 is a continuation of the FIG. 3 flowchart.

Next, the zero point value CAINZP calculated at the step S16 is subjected to the limit checking shown in FIG. 4. More specifically, first, it is determined at a step S18 whether or not the zero point value CAINZP is equal to or larger than the sum (hereinafter referred to as "the zero point upper limit value" of a predetermined zero point initial value #CAINZPS and a predetermined zero point limit correction term #DCAINZP (e.g. 5 degrees). If the result of the determination is negative (NO), i.e. if the zero point value CAINZP is smaller than the zero point upper limit value (NO to step S18), the program proceeds to a step S19, wherein it is determined whether or not the zero point value CAINZP is equal to or smaller than the difference (hereinafter referred to as "the zero point lower limit value" obtained by subtracting the predetermined zero point limit correction term #DCAINZP from the predetermined zero point initial value #CAINZPS. Then, if the result of the determination at the step S19 is negative (NO), i.e. if the zero point value CAINZP is larger than the zero point lower limit value, the program is immediately terminated, whereby the zero point value CAINZP calculated at the step S16 is finally set to the zero point value CAINZP.

On the other hand, if it is determined at the step S18 that the zero point value CAINZP is equal to or larger than the zero point upper limit value (YES to step S18), the zero point value is set to the zero point upper limit value at a step S20, followed by terminating the program. If it is determined at the step S19 that the zero point value CAINZP is smaller than the lower limit value CAINZP (YES to step S19), the zero point value CAINZP is set to the zero point lower limit value at the step S21, followed by terminating the program.

Then, by using the zero point value CAINZP calculated as described above, the detected cam angle CASVIN is corrected, and further, the cam phase CAIN is calculated. Based on the cam phase CAIN, a feedback control value for control of the intake cam 4a by the VTC 9 is determined, and the drive signal (control signal) based on the feedback control value is delivered to the VTC 9 for control thereof.

As described above, according to the valve timing control system 1 of the present embodiment, based on the cam angle CASVIN detected when the VTC 9 is in a predetermined operating condition, i.e. when the intake cam 5a is in the most retarded state, the zero point value CAINZP of the cam phase CAIN is learned at a predetermined learning speed. This learning makes it possible to properly set the zero point of the cam phase CAIN. Further, when the learned zero point value CAINZP is lost from the RAM 2c by a battery cancellation, the learning speed of the zero point value CAINZP is increased for a predetermined time period, whereby the zero point value CAINZP can be promptly established, which enables the cam phase CAIN to be properly changed. This makes it possible to properly control the valve timing via the intake cam 5a. On the other hand, after the predetermined time period has elapsed, the zero point value CAINZP can be properly learned at a slower speed, in a stable manner.

Figure 3:
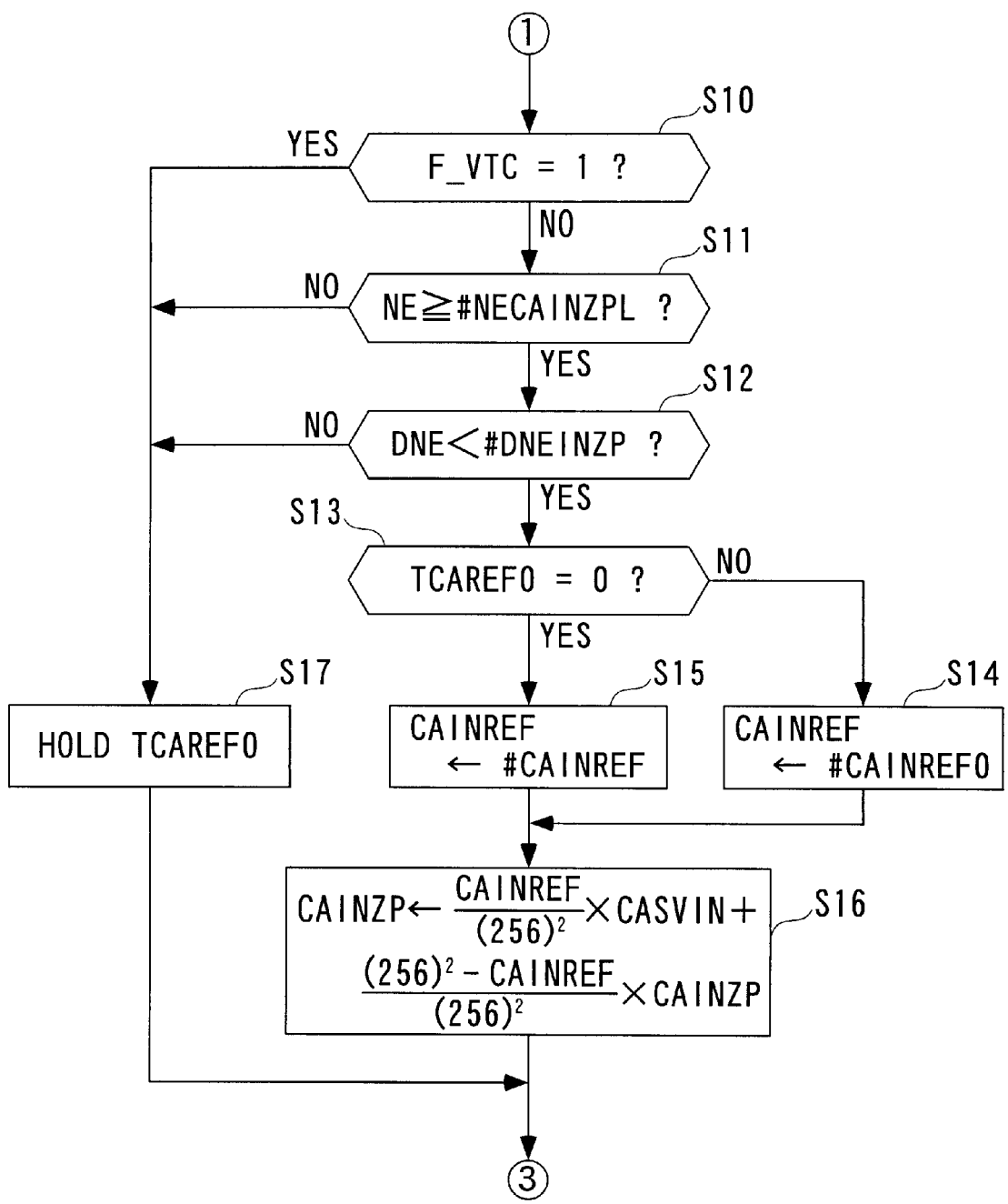
FIG. 3 is a continuation of the FIG. 2 flowchart.

In the above embodiment, the equation employed in calculation of the zero point value CAINZP at the step S16 in FIG. 3 is shown only by way of example, and the valve timing control system may be configured such that the learning speed of the zero point value CAINZP may be changed by changing the value(s) of the averaging coefficient(s), or by changing the frequency of sampling data of the zero point.

Further, although in the present embodiment, the zero point value CAINZP is calculated by using the cam angle CASVIN detected by the cam angle sensor 12, this is not limitative, but the cam phase CAIN may be used for calculation of the zero point value CAINZP.

It is further understood by those skilled in the art that the foregoing is a preferred embodiment of the invention, and that various changes and modifications may be made without departing from the spirit and scope thereof.

What is claimed is:

1. A valve timing control system for an internal combustion engine having a crankshaft, an intake cam, and an exhaust cam, the valve timing control system controlling valve timing of said engine by changing a cam phase of at least one of said intake cam and said exhaust cam relative to said crankshaft,
the valve timing control system comprising:
a cam phase change mechanism for changing said cam phase;
cam phase detection means for detecting said cam phase;
reference position-learning means for learning a reference value indicative of a reference position of said cam phase at a predetermined learning speed based on said cam phase detected by said cam phase detection means when said cam phase change mechanism is in a predetermined operative state;

storage means for storing therein said reference value learned by said reference position learning means;

reference value loss detection means for detecting whether or not the reference value is lost from the storage means; and learning speed-correcting means for correcting a learning speed at which said reference position-learning means learns said reference value such that said learning speed is increased from said predetermined learning speed for a predetermined time period, when said reference value loss detection means detects loss of said reference value from said storage means.

2. A valve timing control system according to claim 1, wherein said storage means comprises a first RAM, and wherein said reference value loss detection means is a counter implemented by a second RAM that is provided separately from said first RAM and is battery-backed-up, said counter detecting said loss of said reference value from said first RAM due to interruption of supply of electric current to said first RAM by being reset to a predetermined value when said interruption of said supply of electric current to said first RAM occurs.

3. A valve timing control system according to claim 1, wherein said predetermined operative state of said cam phase change mechanism is a state in which said cam phase change mechanism is not in operation and said cam phase is most retarded.

4. A valve timing control system according to claim 1, including operating condition determination means for determining whether or not said engine is in a predetermined operating condition suitable for learning of said reference value, and reference value learning-permitting means for permitting said learning of said reference value when said operating condition determination means determines that said engine is in said predetermined operating condition.

5. A valve timing control system according to claim 4, wherein said predetermined operating condition of said engine is a condition in which a predetermined time period has elapsed after a start of said engine, said intake cam is in a most retarded state, and a rotational speed of said engine is equal to or larger than a predetermined value, and a variation in said rotational speed of said engine is lower than a predetermined level.

6. A valve timing control system according to claim 1, wherein said learning speed correction means comprises a downcount timer which is set to a predetermined time period when said reference value loss detection means detects said loss of said reference value from said storage means, and coefficient-setting means for setting an averaging coefficient applied to an average value-calculating equation used for said learning of said reference value to a value corresponding to a larger leaning speed than said predetermined learning speed, before said downcount timer counts down to zero.

* * * * *